W. R. WALKER.
Churn-Dasher.
No. 215,186. Patented May 6, 1879.
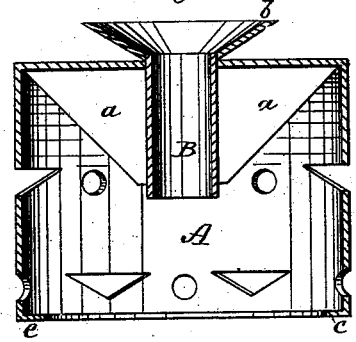
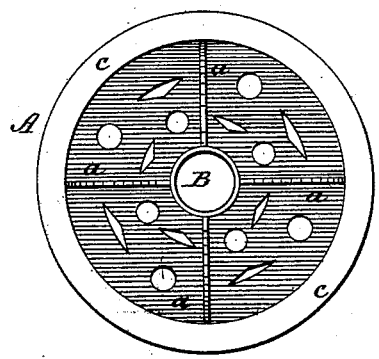
WITNESSES:
W. W. Hollingsworth
Edw. W. Byrn.
INVENTOR:
W. R. Walker
BY
ATTORNEYS.

UNITED STATES PATENT OFFICE.

WILLIAM R. WALKER, OF RONCEVERTE, WEST VIRGINIA.

IMPROVEMENT IN CHURN-DASHERS.

Specification forming part of Letters Patent No. 215,186, dated May 6, 1879; application filed February 18, 1879.

*To all whom it may concern:*

Be it known that I, WILLIAM ROBERT WALKER, of Ronceverte, in the county of Greenbrier and State of West Virginia, have invented a new and Improved Churn-Dasher; and I do hereby declare that the following is a full, clear, and exact description of the same, reference being had to the accompanying drawings, forming part of this specification, in which—

Figure 1 is a central vertical section. Fig. 2 is an underneath or inverted-plan view.

My invention consists of a churn-dasher constructed in the form of a cylindrical inverted and perforated cup, having a socket-tube for the handle, braced by radial cutting-blades in said cup, and having around the top of said tube, on the exterior of the cup, a conical upwardly-flaring flange, as hereinafter more fully described.

In the drawings, A represents the dasher, which is made of a cylindrical shape, and is perforated with holes of different sizes and irregular shapes, the making of said holes of different sizes and shapes contributing, as I find, to the efficiency of the dasher. In the upper end of the dasher is fixed a socket-tube, B, to receive the end of a wooden handle. Said tube projects into the cup, and is braced by radial blades $a$, which are fixed to the upper portion of the cup, and taper in width to the periphery of the same. These blades serve not only to hold and brace the socket-tube, but they act as knives to cut the cream, and thus assist in churning.

Upon the upper side of the cup, and tapering upward with a flare from the socket-tube, is a conical flange, $b$. This flange is designed to prevent the cream from flying out through the hole in the top of the churn when the dasher descends. It may be observed that when a churn-dasher descends rapidly into the cream the latter, in closing in a concentric wave over said dasher, comes together at the center and spurts up through the hole in the cover of the churn. To prevent this I employ the conical flange $b$.

Now, with this construction, it will be seen that when the cream closes over the dasher the concentric wave is broken up by the flange and the central impact and spurting up of the same are prevented.

Upon the lower edge of the cylindrical cup is an inturned flange, $c$. This gives a better impact upon the cream, and the latter, in passing the horizontal edge, is more rapidly churned.

I am aware that a dasher has been made in a conical form, with a disk located near the apex of the cone, and that radial blades have been arranged to diverge from the socket-tube to a cylindrical outer surface. I therefore limit my invention to the peculiar construction shown and described.

Having thus described my invention, what I claim as new is—

A churn-dasher consisting of the cylindrical perforated cup A, having a socket-tube, B, braced by radial blades $a$, and provided also with a conical and upwardly-flaring flange, $b$, located upon the upper and outer surface of the dasher about the socket-tube, and rising from the plane of the top of the cup, substantially as shown and described.

WILLIAM ROBERT WALKER.

Witnesses:
GEO. W. HENNING,
LEWIS S. CREIGH.